May 2, 1950                 J. P. LIMBACH            2,505,778
DEVICE FOR DETERMINING MOISTURE CONTENT,
DENSITY, AND DIRECTION OF GRAIN OF WOOD,
AND OTHER SEMICONDUCTING MATERIAL

Filed Aug. 16, 1946                                                  3 Sheets-Sheet 1

INVENTOR
J.P. LIMBACH
BY
ATTORNEY

May 2, 1950 J. P. LIMBACH 2,505,778
DEVICE FOR DETERMINING MOISTURE CONTENT,
DENSITY, AND DIRECTION OF GRAIN OF WOOD,
AND OTHER SEMICONDUCTING MATERIAL
Filed Aug. 16, 1946 3 Sheets-Sheet 2

INVENTOR
J. P. LIMBACH
BY H. M. Foss
L. M. Mantell
ATTORNEY

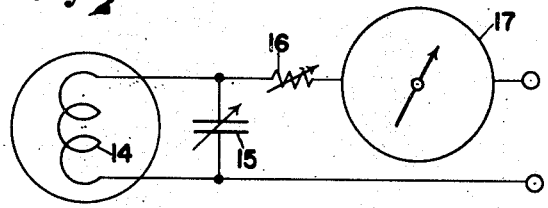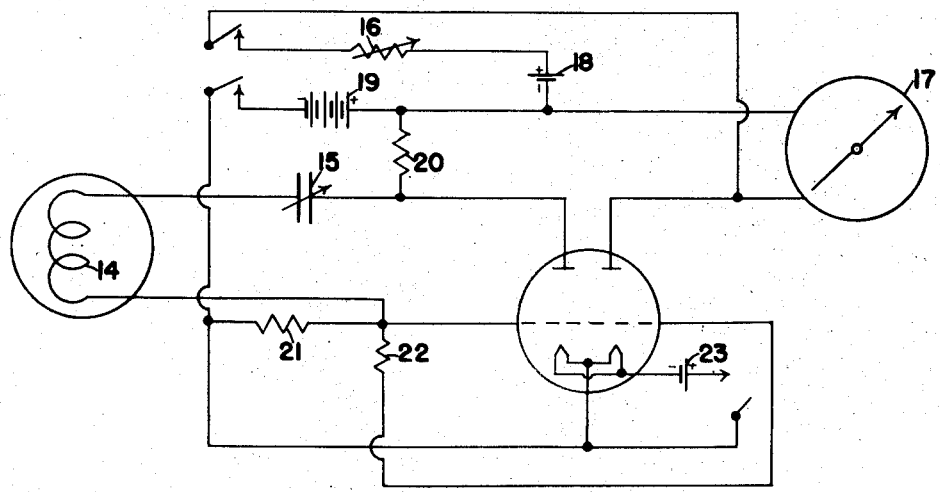

Patented May 2, 1950

2,505,778

UNITED STATES PATENT OFFICE 2,505,778

DEVICE FOR DETERMINING MOISTURE CONTENT, DENSITY, AND DIRECTION OF GRAIN OF WOOD, AND OTHER SEMICONDUCTING MATERIAL

John P. Limbach, Madison, Wis., dedicated to the free use of the People in the territory of the United States Application August 16, 1946, Serial No. 690,880

(Granted under the act of March 3, 1883, as amended April 30, 1928; 370 O. G. 757)

4 Claims. (Cl. 175—183)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

My invention relates to the determination of moisture content, density, and direction of grain where present, as in wood, of semiconductive materials by the measurement of the effect that such materials or their contained components have upon a varying electromagnetic field. The contained moisture is determined by measurement of the effect of the moisture upon a varying electromagnetic field over and above the effect produced upon this field by the material itself. The density of semiconductive materials is determined by a measurement or comparison of the effect of these materials upon a varying electromagnetic field when such materials are either free from moisture or are at a relatively low moisture content, in which case the moisture content is suitably compensated for. The direction of grain of a semiconductive material, such as wood, is determined by a measurement of the difference of the effect of a unidirectional varying electromagnetic field upon such materials or their contained components when the grain direction of these materials is oriented in different directions with respect to the direction of the electromagnetic field.

Figure 1:
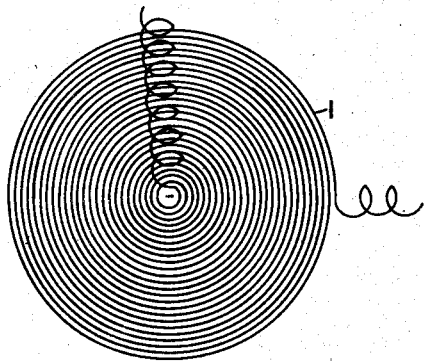
Figure 2:
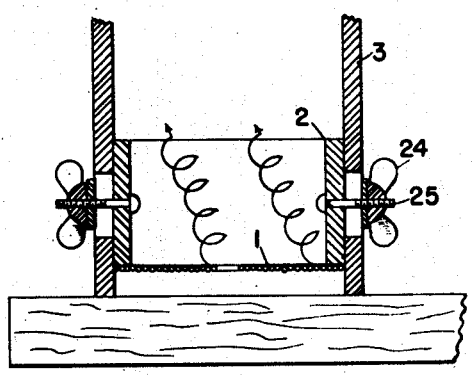
Figure 3:
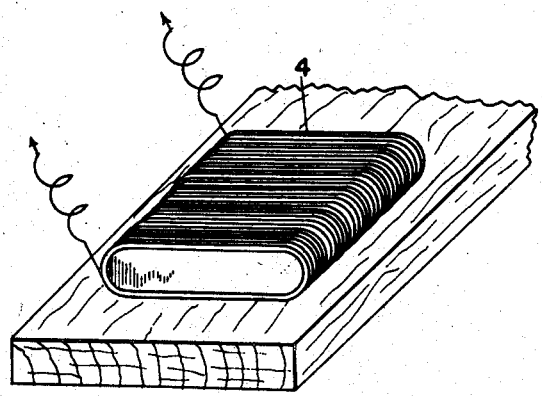
Figure 4:
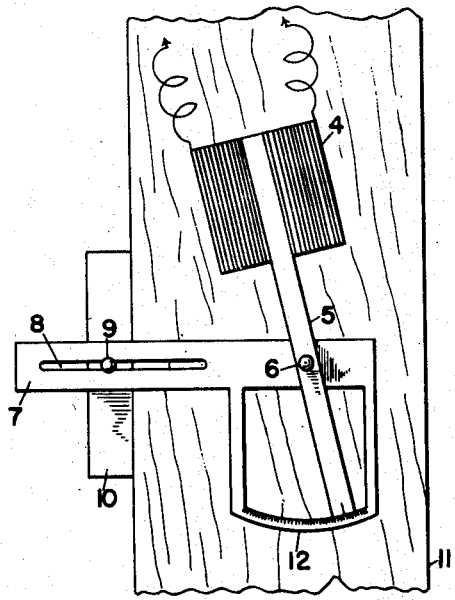
Figure 5:
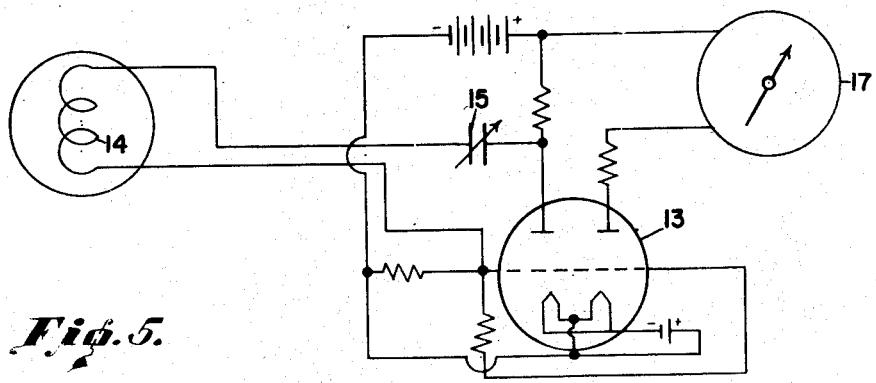

I attain these objects by the apparatus illustrated in the accompanying drawing, in which Figure 1 is a spiral coil; Figure 2 is a vertical section of an apparatus for mounting the spiral coil above the material under test; Figure 3 illustrates the type of coil that is used to measure direction of grain of materials; Figure 4 is a plan view of the coil of Figure 3 pivotally mounted over the board being tested; Figures 5 and 6 illustrate two circuits that may be used in conjunction with the coils; and Figure 7 is a modification of the circuit of Figure 5.

The coil I shown in Figure 1 comprises a single spiral of insulated wire. This coil may be flat, for application to flat surfaces, or it may be bent or shaped to conform to other surfaces. It may be applied directly to the surface of the material under examination or it may be supported above the material at a known or definite distance as shown in Figure 2. Coil I is used to determine moisture content and density of semiconducting materials. This flat, single-thickness coil is designed to give a maximum response when placed adjacent to a flat wood surface, since all turns are very close to the wood, thus concentrating the field as close to the wood as possible. The direction of the grain does not affect the response of this type of coil, regardless of how the coil is turned upon the surface of the wood. By spiral, I mean winding or circling around an axis and gradually receding from it.

Spiral coil I is held on collar 2 by any conventional means. Collar 2 is mounted in sleeve 3 by thumb nuts 24 and screws 25.

The coil 4 shown in Figures 3 and 4 is a somewhat flattened solenoid or helix of insulated wire which may be wound upon any suitable core, which may be hollow and should be of a material that is not responsive to moisture changes. The solenoid may be encased in a resin, eliminating the need for a core. The coil of Figures 3 and 4 is used for the measurement of the direction of grain of materials. In Figure 4 the solenoid is shown mounted on an indicator bar 5 which is pivoted at 6 upon the strip 7. Strip 7 is adjustably mounted, by means of groove 8 and pin 9, upon T-head 10 which fits against an edge of the board 11 being tested. Attached to or integral with strip 7 is an angle indicating scale 12, whereby the angle between the wires and the edge of the material may be determined.

The electrical circuit disclosed in Figures 5 and 7 comprises a vacuum tube oscillator and vacuum tube voltmeter. The left half of vacuum tube 13 (1G6GTG) drives the oscillatory circuit composed of the 13.3 microhenry coil 14 and 0-30 micromicrofarad trimmer condenser 15. The right half of the tube acts as a vacuum tube voltmeter to detect and indicate a change in the oscillator coil when placed near an absorbing material such as wood. The inductance of the coil may vary over a wide range. Suggested values for the other elements shown in Figure 7 are as follows: A 500,000 ohm resistor 16 and a 1.5 volt cell 18 are connected across the 0-150 microamp. meter 17. In the filament-plate circuit are a 90 volt battery 19 and a 50,000 ohm resistor 20. Resistor 21 is 100,000 ohms. Resistor 22 is 2 megohms. The filament cell 23 is 1.5 volts. These values are optional and the circuit may be re-designed according to well known principles.

Figure 6 is a resonance type circuit which is coupled to a radio frequency oscillator. The circuit comprises a 13.3 microhenry coil 14 shunted by 0-30 micromicrofarad trimmer condenser 15. Resistor 16 is 500,000 ohms. The meter indicates 0-150 microamps.

The manner in which the instrument is employed will now be described.

Determination of the moisture content of semiconducting materials

While contained moisture is a very large factor contributing to the effect that a semiconducting material has upon a varying electromagnetic field, the nature of the substance itself is also such a factor. For this reason it is necessary, when determining the moisture content of these substances, to subtract from the total effect of the substance with its contained moisture, the effect of the substance alone. This implies a correction factor for each different substance, and in fact even different types of the same substance such as the various species of wood.

Regarding even the same species of wood, the field is affected by the density of such wood. In most cases the effect of density within a species of wood is relatively slight as compared to the effect which any appreciable amount of contained moisture has upon a varying electromagnetic field, with the result that it is justifiable to assume an average density for a species and determine moisture contents on the basis of this assumed average density. Any errors due to reasonable variations from this assumed average value of density are negligible when determining appreciable moisture contents.

The procedure for calibrating the meter of the device to read moisture content values of Douglas-fir between the limits of 6 percent and 30 percent is as follows:

1. Obtain a number of specimens of typical Douglas-fir of average density and condition some of these to, let us say, 6 percent, some to 12 percent, some to 18 percent, some to 24 percent, and the remainder to 30 percent moisture content.

2. Place the detection unit of the device upon the 6 percent moisture content specimens, note the deflection of the meter, and calibrate it as the 6 percent moisture content point.

3. Repeat the above process with the 12, 18, 24, and 30 percent moisture content specimens.

4. Interpolate between calibrated points for intermediate values and draw the moisture content scale.

The device thus calibrated is ready for use in the determination of the moisture content values of Douglas-fir. In use, the detection unit is placed uopn the Douglas-fir under examination and the calibrated dial read directly in moisture content values.

Meter dials for the determination of moisture content values of other species of wood or of other materials are prepared in a similar manner.

Determination of the density of semiconducting materials

While the effect of the contained moisture of a material upon a varying electromagnetic field is great, determination of density of such materials can be made nonetheless by applying a procedure similar to that given below for balsa.

Procedure for determining the density of balsa by means of a varying magnetic field 1. Obtain a uniform low-density specimen of balsa.

2. Carefully determine the density of this specimen by standard methods such as weighing and measuring when at a known moisture content or when oven dry. This specimen will henceforth be referred to as the "low-density master block."

3. Obtain a uniform medium density specimen of balsa.

4. Carefully determine the density of this specimen by a standard method. This specimen will henceforth be referred to as the "medium-density master block."

5. Obtain a uniform high-density specimen of balsa of uniform density throughout its length, width, and thickness.

6. Carefully determine the density of this specimen by a standard method. This specimen will henceforth be referred to as the "high-density master block."

7. Condition all three of the master blocks along with the material to be checked for density so that the master blocks and the material will be at the same percent moisture content.

8. When the master blocks and the material to be checked for density are at a uniform and relatively low percent moisture content, calibrate the meter of the measuring device in terms expressing density by means of the master blocks. (The coil is set upon the low-density master block and the meter reading is calibrated for the known value of density of this master block. The process is repeated for the medium and high-density master blocks and intermediate calibrations are interpolated.)

9. Proceed to read the density values of the material to be checked for density by setting the coil upon the material under examination and reading the calibrated meter of the measuring device.

The foregoing procedure regarding balsa is illustrated merely to demonstrate a method of applying a varying electromagnetic field for the determination of the density of a relatively large quantity of a material and it is to be understood that similar methods apply as well to other semiconducting materials.

Determination of the direction of grain of semiconducting materials

Any semiconducting material having unidirectional elements such as fibers or pores can be examined for the direction of these elements by its inspection under a unidirectional varying electromagnetic field. Such a field may affect the elements of the material to a greater or lesser extent depending upon their orientation with respect to the field, hence a measure of the effect on the field can be used as an indication of the orientation of such elements. Frequently, the application of slight amounts of moisture or other conducting substance to the surface of such a material increases the selective effect of the unidirectional elements by reason of the orientation of the moisture or other conducting substance in the direction of such elements.

With wood, the field is least affected when the direction of the fibers is the same as the direction of the wires of the coil winding (see Fig. 4) and most affected when the direction of the fibers is at right angles to the direction of the coil winding, hence a typical procedure in determining the direction of grain of a piece of wood would be as follows:

1. Place the electromagnetic coil upon the surface of the wood and orientate it until its field is the least affected by the wood as shown, for example, by a minimum ammeter deflection in circuit in Figure 5a. (In instances where the wood is unpainted, the surface may be dampened with moisture or with some other conducting substance before inspection to augment the selective effect of the field.)

2. When it is desired to determine the angle that the grain direction makes with the edge of the material it is required to determine the angle the wires of the coil make with the edge of the material. This can be readily accomplished with equipment such as that shown in Figure 4.

Radio frequencies in the broadcast frequency range can be used. Audio, super-sonic and higher frequencies may also be used.

Having thus described my invention, I claim:

1. An apparatus for determining the direction of grain in wood comprising a helical inductance coil adapted to be placed on or adjacent to the surface of the material to be tested, a circuit connected to said coil to impress a predetermined high frequency alternating electric current through said coil, means for pivotally supporting the coil for rotation over the surface of the wood about an axis perpendicular to the longitudinal axis of the helix, the longitudinal axis of the helix being disposed longitudinally to the surface of the wood, means indicating the angle through which the coil is rotated, means connected to said high frequency alternating current circuit to indicate a change in the current as the coil is rotated.

2. The apparatus defined in claim 1 in which the inductance coil is a helical coil of flattened cross-section mounted upon an indicator bar, said bar being pivotally mounted upon a strip, so that the bar and coil may be rotated about an axis perpendicular to the axis of the coil and the coil rotated in the plane of the flat of the coil, said strip being attached at a predetermined angle to a T-head that is adapted to fit against the edge of the wood being tested, an indicator scale on said strip which cooperates with said indicator bar to indicate the angle between the grain and the edge of the wood.

3. A method of determining the direction of grain in wood comprising placing a helical inductance coil on or adjacent to the surface of the wood, the longitudinal axis of the helix being disposed longitudinally to the surface of the wood, impressing a high frequency alternating current upon the coil, indicating a function of the current, turning the coil about an axis transverse to the longitudinal axis of the coil and transverse to the surface of the wood until the indicator shows an inflection point in said current function.

4. An apparatus for determining directional physical properties of a material comprising a flattened helical inductance coil adapted to be placed on or adjacent to the surface of the material to be tested, a circuit connected to said coil to impress a predetermined high frequency electric current through said coil, means for pivotally supporting the coil for rotation over the surface of the said material about a pivotal axis that is perpendicular to the longitudinal axis of the helix, the longitudinal axis of the helix and the planes of the flattened surfaces of the coil being disposed longitudinally to the surface of the material, means indicating the angle through which the coil is turned about said pivotal axis, means connected to said high frequency circuit to indicate a change in the current as the coil is turned about the pivotal axis.

JOHN P. LIMBACH.

REFERENCES CITED

The following references are of record in the file of this patent:

UNITED STATES PATENTS

| Number | Name | Date |
| --- | --- | --- |
| Re. 21,711 | Blake | Feb. 11, 1941 |
| 1,708,074 | Allen | Apr. 9, 1929 |
| 1,780,952 | Symes | Nov. 11, 1930 |
| 1,943,619 | Mudge et al. | Jan. 16, 1934 |
| 2,023,228 | Hermann | Dec. 3, 1935 |
| 2,231,035 | Stevens et al. | Feb. 11, 1941 |
| 2,308,566 | Noxon | Jan. 19, 1943 |
| 2,326,344 | Elmendorf et al. | Aug. 10, 1943 |
| 2,389,190 | Fermier | Nov. 20, 1945 |

Certificate of Correction

May 2, 1950

Patent No. 2,505,778

JOHN P. LIMBACH

It is hereby certified that error appears in the above numbered patent requiring correction as follows:

In the grant, lines 1 and 14, name of inventor, for "Joseph P. Limbach" read *John P. Limbach*; and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*